Feb. 12, 1929.  H. B. SCOTT  1,702,023
AUTOMATIC DOWEL PIN GRINDER
Filed July 9, 1926   12 Sheets-Sheet 5
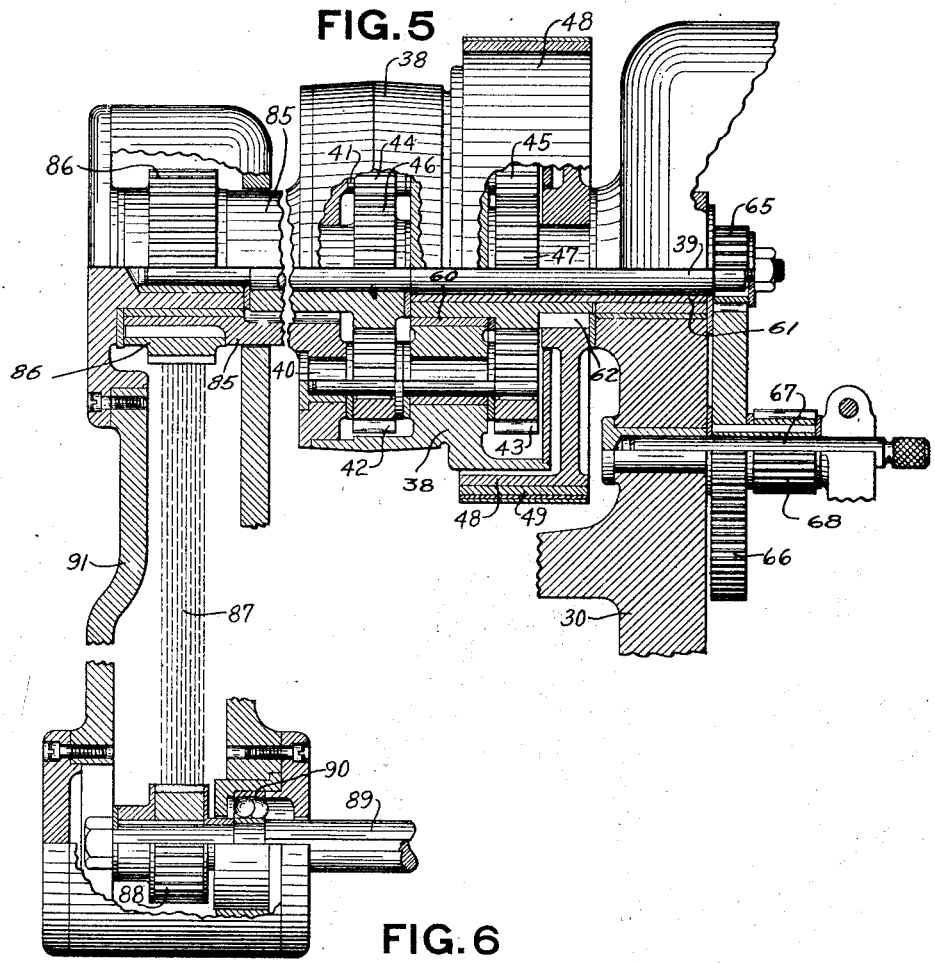

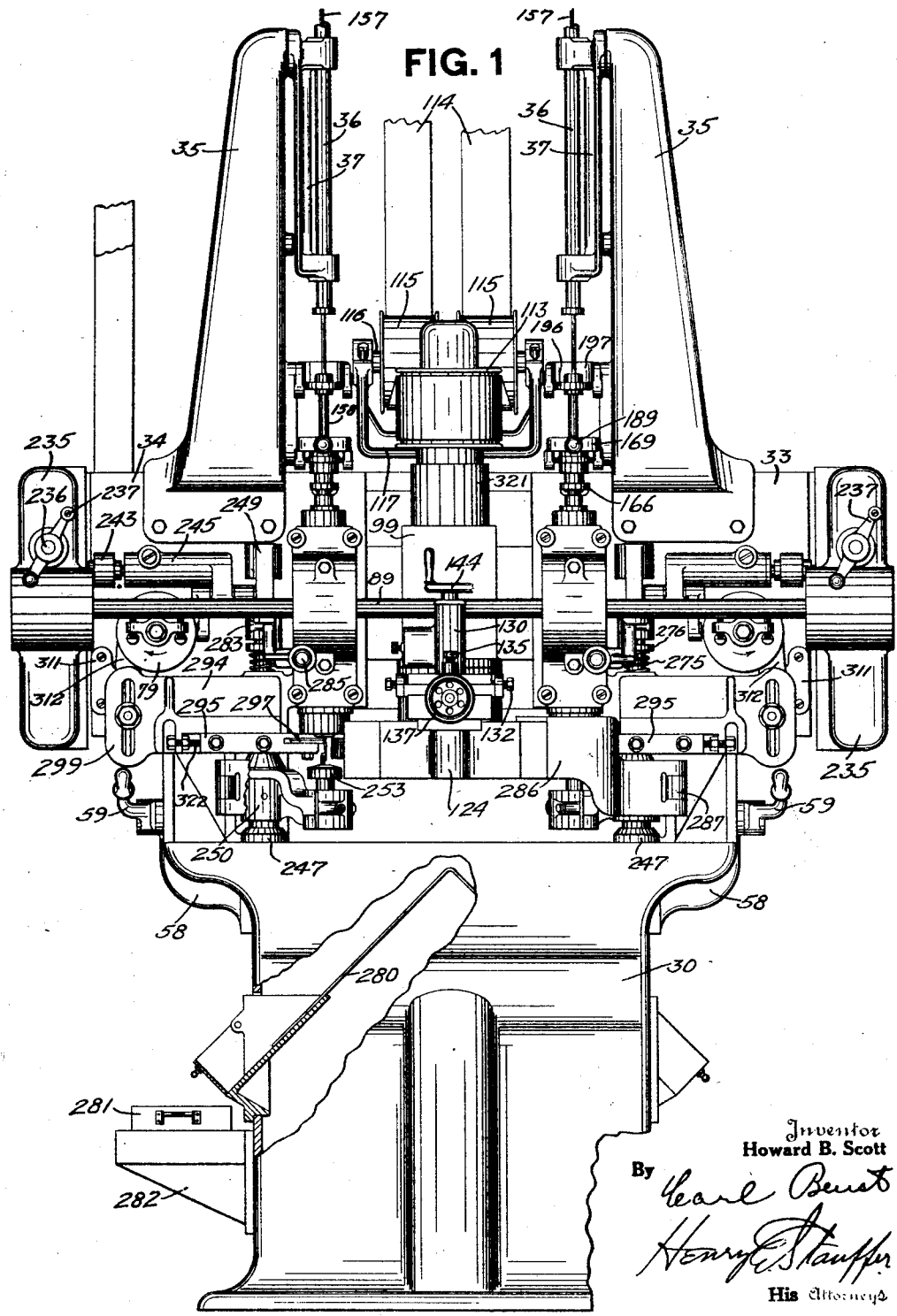

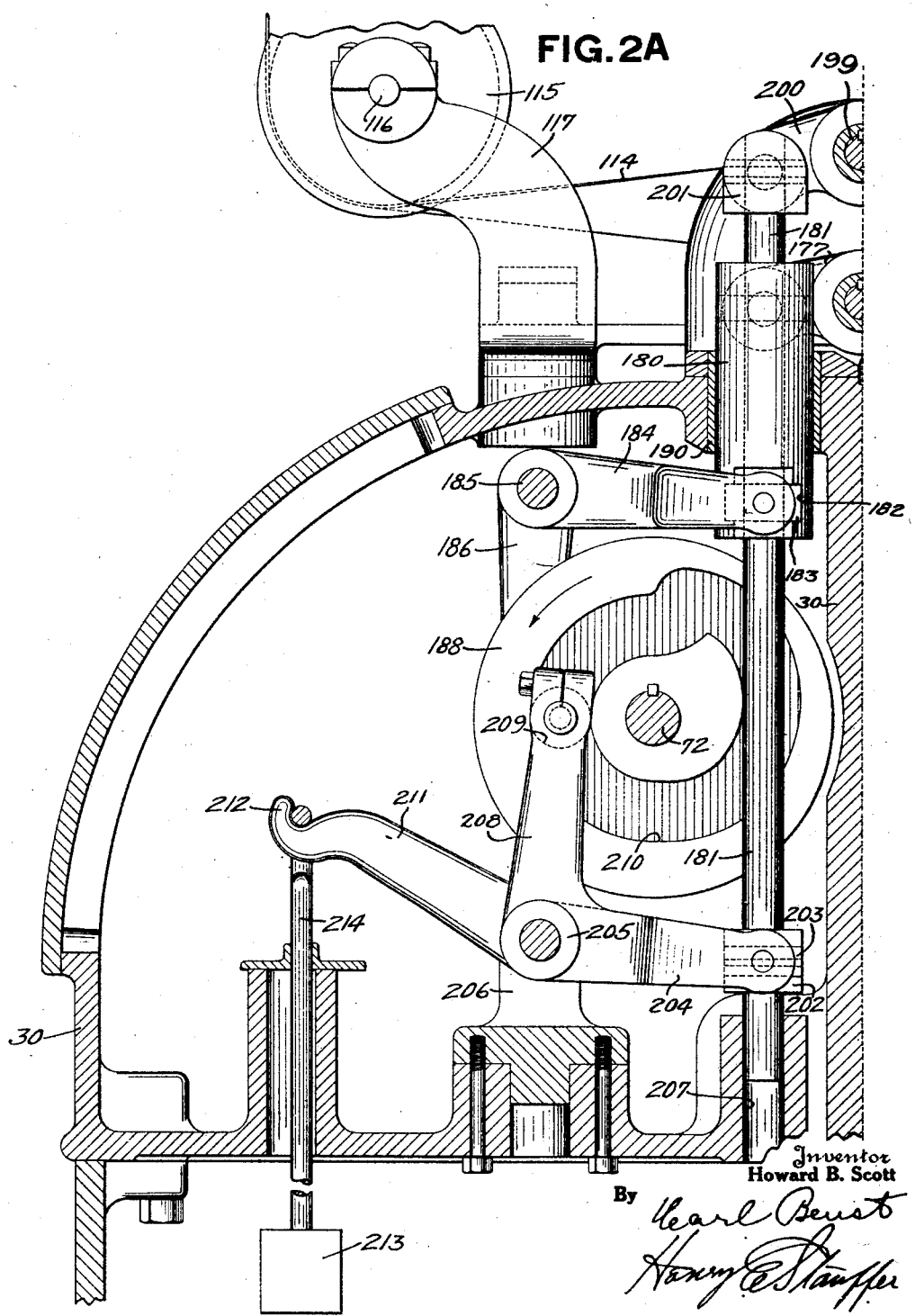

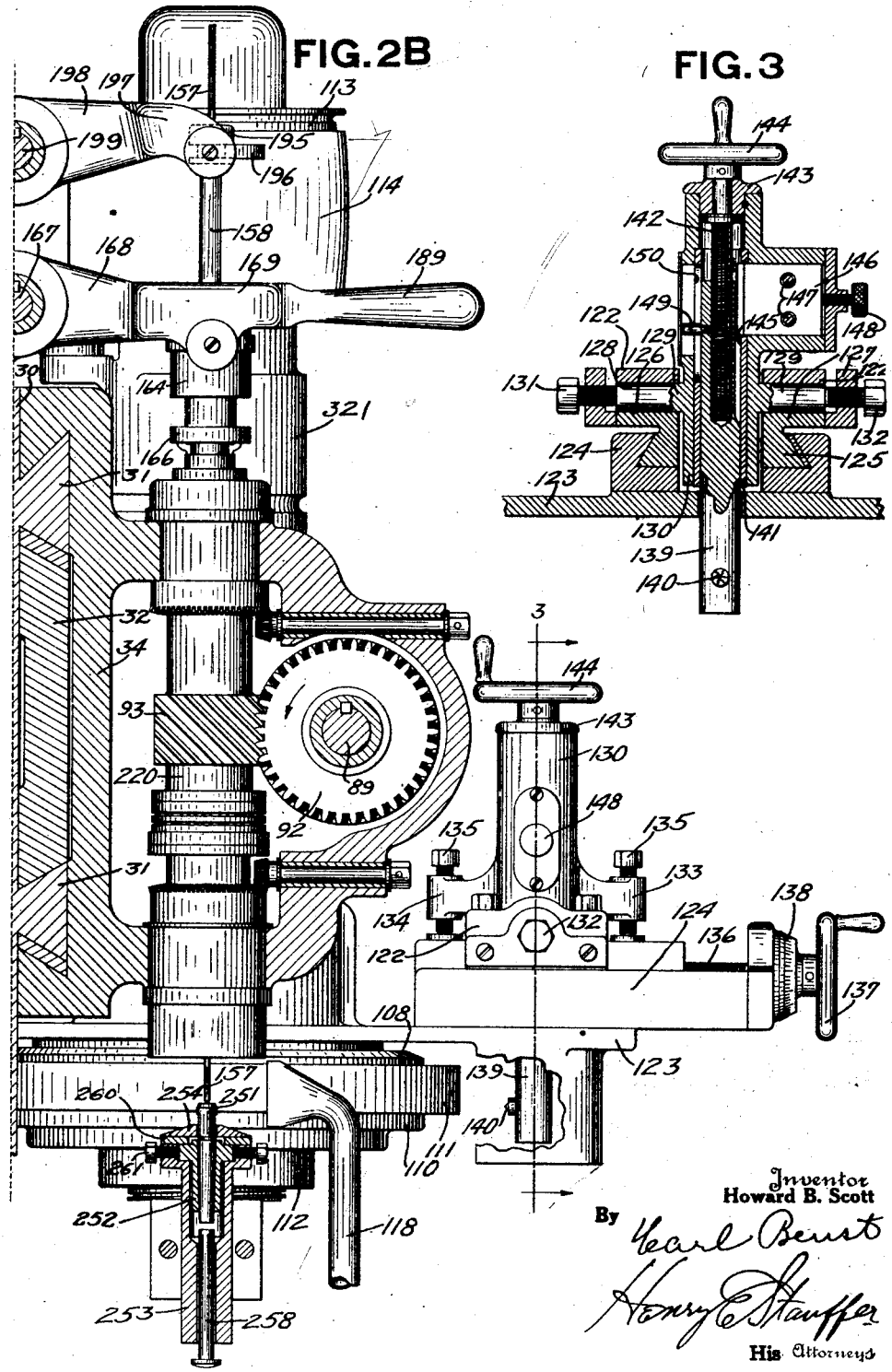

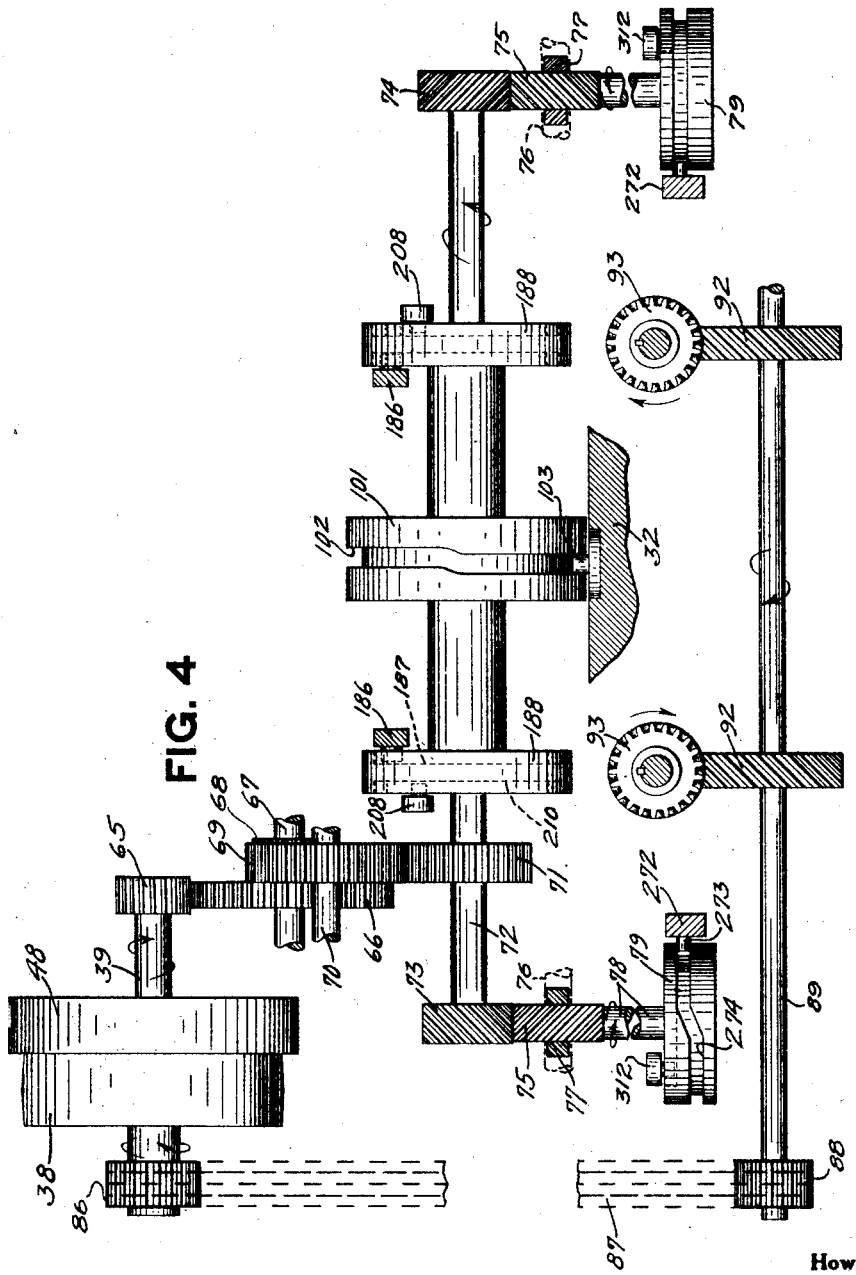

Feb. 12, 1929.

H. B. SCOTT 1,702,023

AUTOMATIC DOWEL PIN GRINDER

Filed July 9, 1926

Inventor
Howard B. Scott

By Earl Beust
Henry E Stauffer

His Attorneys

Feb. 12, 1929.

H. B. SCOTT 1,702,023

AUTOMATIC DOWEL PIN GRINDER

Filed July 9, 1926     12 Sheets-Sheet 8

Inventor
Howard B. Scott
By Carl Beust
Henry E. Stauffer
His Attorneys

Feb. 12, 1929.
H. B. SCOTT
1,702,023
AUTOMATIC DOWEL PIN GRINDER
Filed July 9, 1926   12 Sheets-Sheet 9
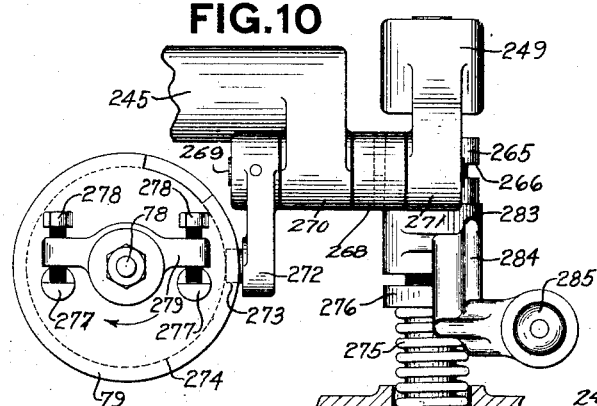
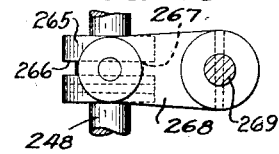
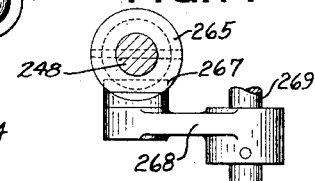
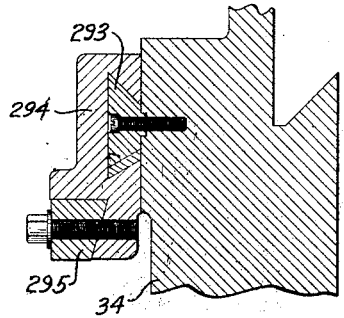
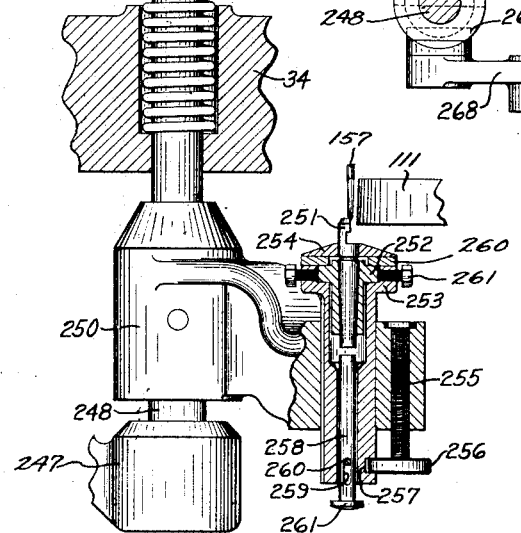
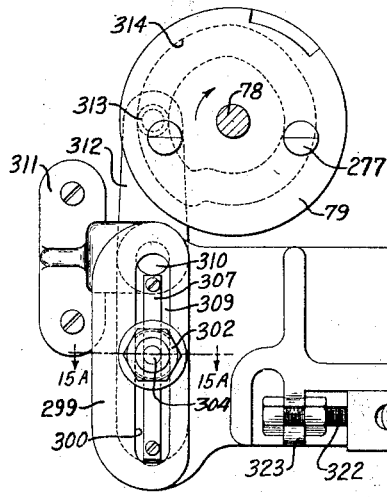
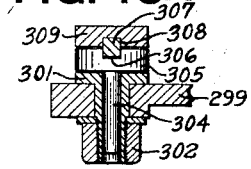
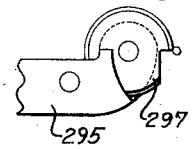
Inventor
Howard B. Scott
By Earl Benet
Henry E. Stauffer
His Attorneys

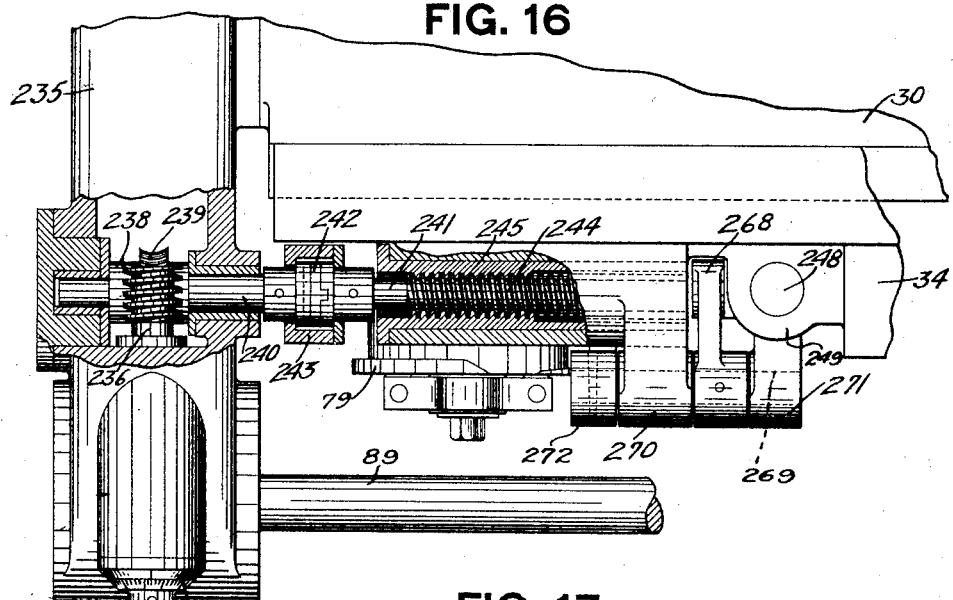
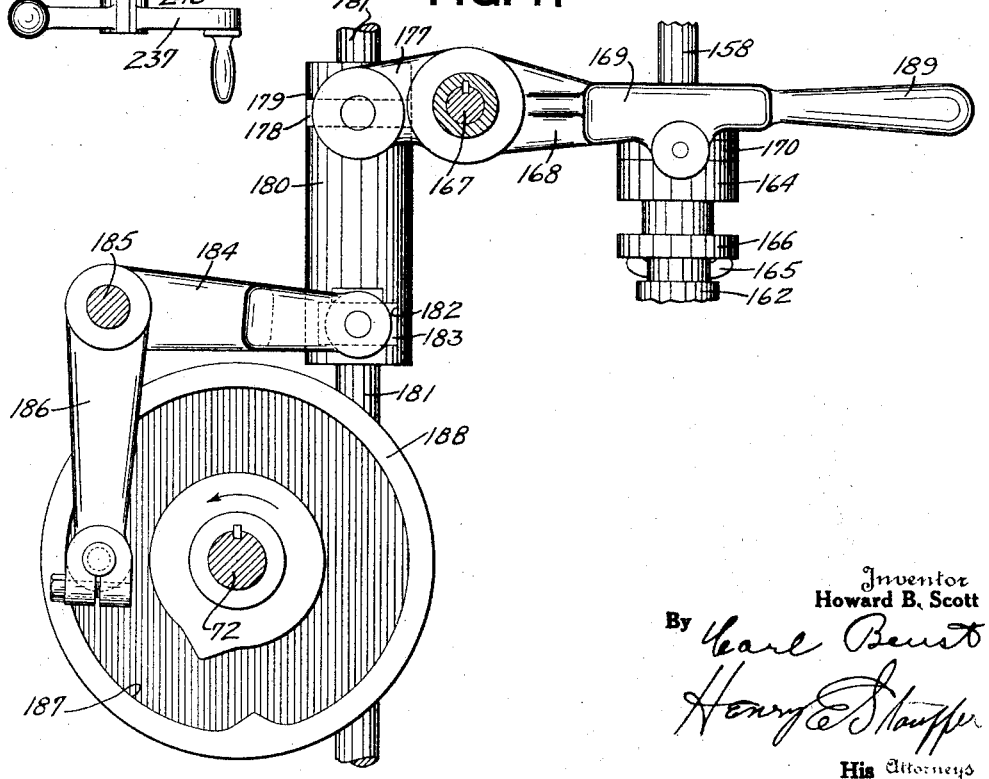

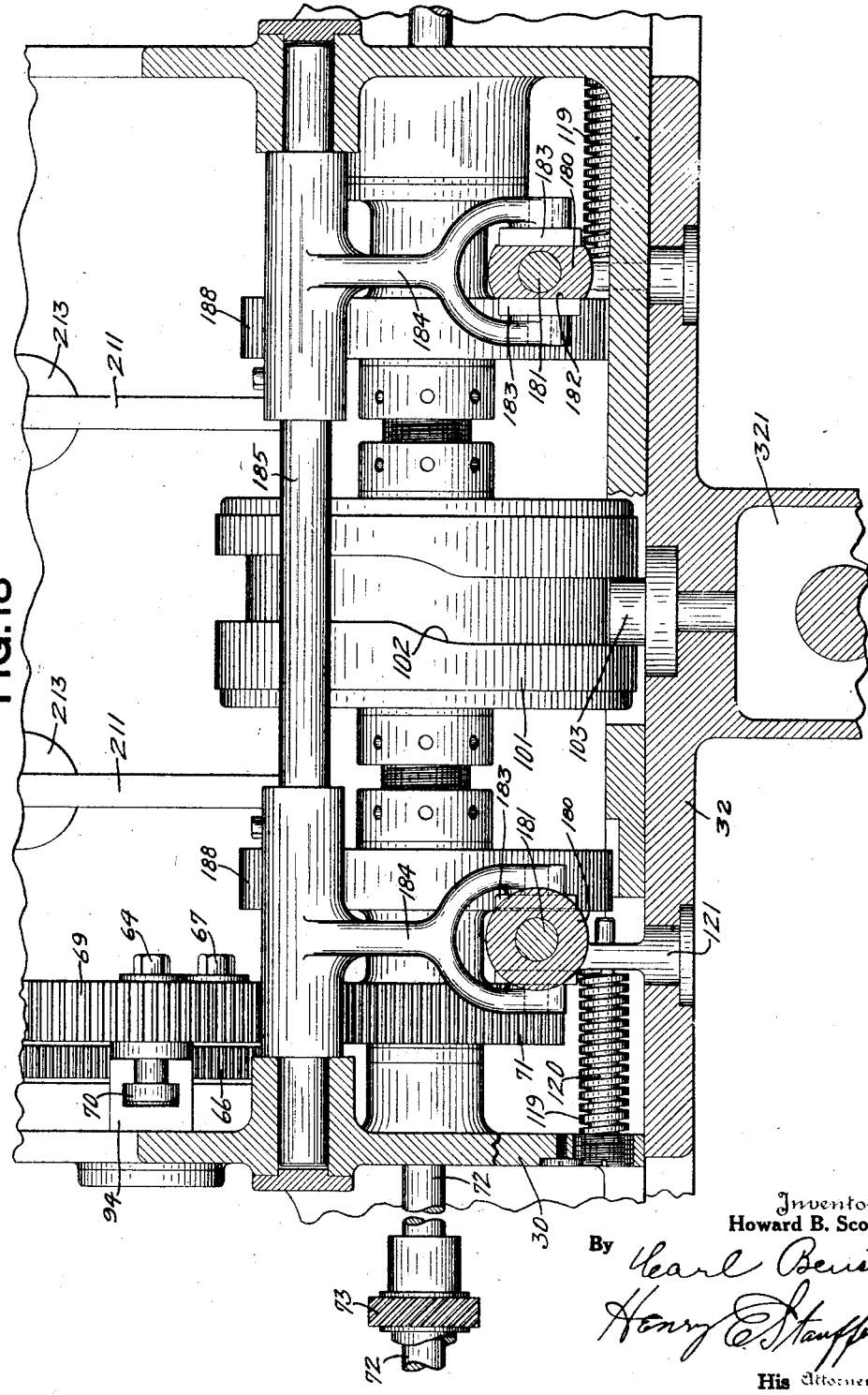

Feb. 12, 1929.

H. B. SCOTT 1,702,023

AUTOMATIC DOWEL PIN GRINDER

Filed July 9, 1926 — 12 Sheets-Sheet 12

Inventor
Howard B. Scott
By
His Attorneys

Patented Feb. 12, 1929.

1,702,023

UNITED STATES PATENT OFFICE.

HOWARD B. SCOTT, OF DAYTON, OHIO, ASSIGNOR TO THE NATIONAL CASH REGISTER COMPANY, OF DAYTON, OHIO, A CORPORATION OF MARYLAND.

AUTOMATIC DOWEL-PIN GRINDER.

Application filed July 9, 1926. Serial No. 121,412.

This invention relates to automatic grinding machines, and more particularly to machines adapted to grind tapered forms, as dowel pins or the like.

One object of this invention is to provide a machine which will grind dowel pins or like forms with any desired taper.

Another object is to design a machine to which two pieces of stock may be fed simultaneously, and adapted to grind a tapered form from each of these pieces alternately.

Another object is to provide novel means for cutting off the article after the grinding operation is finished.

Still another object is to provide novel means for feeding the stock to bring a new portion thereof into position to be ground.

Another object is to provide a novel adjustable stop which is adapted to control the length of the article to be ground.

Still another object is to provide novel means for dressing the grinding stone at any desired angle.

With these and incidental objects in view, the invention includes certain novel features of construction and combinations of parts, the essential elements of which are set forth in appended claims, and a preferred form or embodiment of which is hereinafter described with reference to the drawings which accompany and form part of this specification.

Of said drawings:

Fig. 1 is a view in front elevation of the complete machine.

Figs. 2ᴬ and 2ᴮ taken together show a vertical sectional view through the machine.

Fig. 3 is a vertical sectional view through the device which is provided for dressing the grinding wheel.

Fig. 4 is a diagrammatic view of the main driving mechanisms of the machine.

Fig. 5 is a top plan view, partly broken away, showing the planetary gearing through which the machine is driven.

Fig. 6 is a diagrammatic view of the train of gears through which the main driving shafts of said machine receive their movement.

Fig. 10 is a detail view of the work stop and the means for supporting it.

Fig. 11 is a detail sectional view showing the slide which carries the cut-off tool.

Fig. 12 is a detail side elevation of the operating means for the cut-off mechanism, and also shows the means for controlling the depth of the cut.

Fig. 13 is a side elevation of the connections for operating the work stop.

Fig. 14 is a plan view of the mechanism shown in Fig. 13.

Fig. 15 is a detail plan view of the cut-off tool.

Fig. 15ᴬ is a detail sectional view taken on line 15ᴬ—15ᴬ of Fig. 12.

Fig. 16 is a top plan view, partly in section, of the mechanism used to compensate for wear on the grinding stone, and also for differences in the sizes of stock.

Fig. 17 shows a side elevation of the manual means for releasing the chuck.

Fig. 18 is a top plan view of the main cam shaft of the machine, and a portion of the mechanism which cooperates therewith.

Figure 19:
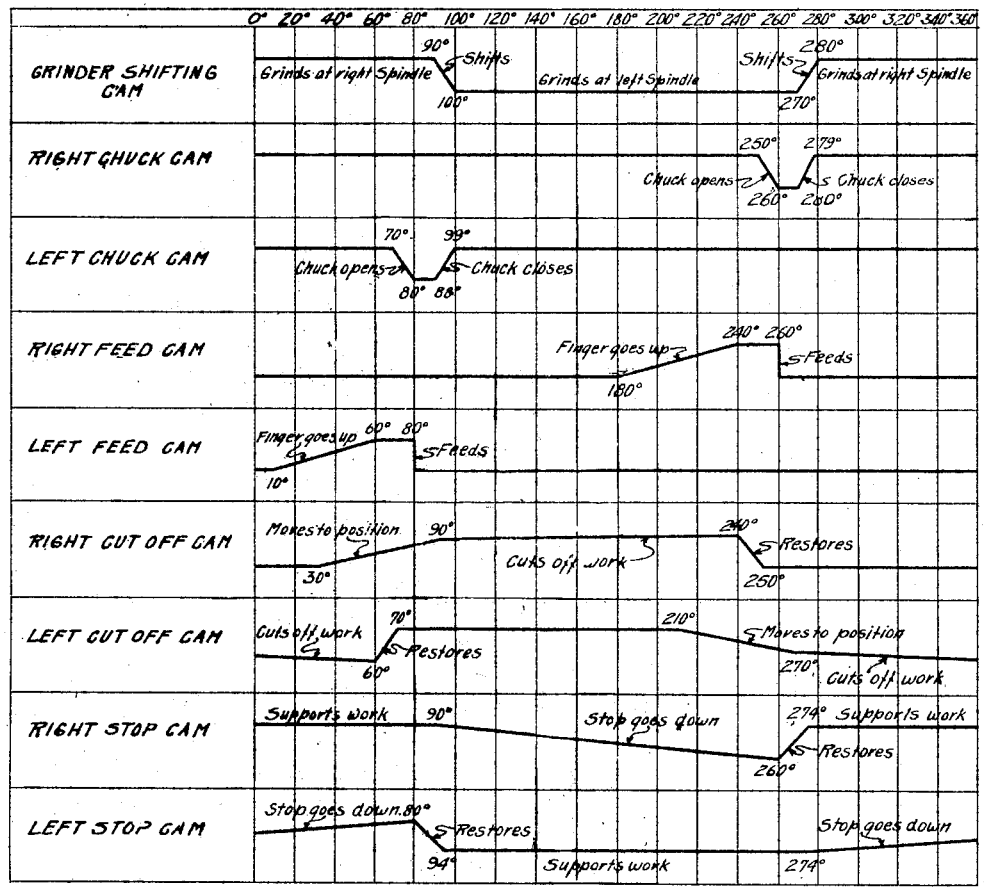

Fig. 19 is a time chart of the various cams which are used to operate the machine.

General description.

This machine is designed for the purpose of automatically producing and grinding tapered forms, as dowel pins. The machine is adapted to operate on two pieces of stock, which may be carried vertically in the machine. Each piece of stock passes through the center of a work spindle, and is held therein by means of a multiple-jawed collet. The length of the pin or article to be ground is determined by means of a work stop. The stock is advanced through the chuck until it comes in contact with the stop, whereupon the collet is tightened to hold the work in position. Located between the work spindles and carried on a laterally movable slide, is a suitable grinding wheel which is rapidly rotated by any suitable means. This grinding wheel is mounted on a well known type of spindle. The slide which carries the grinding wheel spindle is shiftable a short distance to the right and left by means of a suitable cam. This movement brings the grinding wheel into cooperative relation with the stock which is held by the rapidly rotating collet. The periphery of the grinding wheel is dressed at the proper angle to insure the desired taper being ground on the stock which is exposed below the collet. When the grinding of the stock in the right-hand spindle, for instance, is finished, the cam operates to move the grinding wheel into cooperative relation with the stock in the left-hand spindle, to grind the stock held by this spindle. During the time that the stock in the left-hand spindle is being ground, a cut-off tool moves into contact with the stock in the right-hand spindle just below the collet, thereby cutting off the pin at the desired length. After the pin has been cut off, the work stop, against which the stock rests while it is being ground, is withdrawn to permit the finished article to drop into a chute and pass to the outside of the machine. The stock is then advanced through the collet which meanwhile has been loosened to release the stock. After the stock has been advanced, the work stop is restored to its normal position. As the stop returns, it contacts with the stock and shifts it backwardly to its operating position. It is evident that the position of the work stop determines the length of the article to be ground. When the stock is in position to be operated upon, the collet is automatically tightened; and when these operations are finished, the grinding wheel cam shifts the grinding wheel from its cooperative position with the stock in the left-hand spindle into cooperative relation with the stock in the right-hand spindle. While the article in the right-hand spindle is being ground, the above described operations, such as cutting off the finished article from the stock, withdrawing and returning the stop, and feeding the stock, take place in the left-hand spindle, so that the machine operates continuously. When the stock is exhausted, a new piece may be inserted through the work spindle, the collet being manually released, and the operations then continue as above described.

The arrangement whereby the grinding wheel is shifted to operate on the stock in one spindle while one of the cutters is operating upon the finished piece in the other spindle, is very important in a machine of this type where the parts produced must be held to close limits. In some machines in the art, the grinder and cutter operate on the same piece of stock simultaneously. This invention has a distinct advantage thereover, because when the grinder and cutter operate on the same piece simultaneously, the work may be partially severed before the grinding is completed, thus permitting the work to get out of alinement, whereas in this invention, the work is properly supported until the grinding is completed, thus reducing the chance of error to the minimum.

In order that the machine may turn out accurate work, it is necessary to dress the grinding wheel occasionally. A device which forms an integral part of the machine is provided for accomplishing this object. This device includes a diamond cutter, secured to a slide near the lower end thereof. The slide which is supported vertically in an appropriate casing, adjustable both horizontally and vertically to the angle desired. The cutter is brought into contact, by means of the slide, with the periphery of the grinding wheel, to dress the wheel to the proper degree.

As the grinding wheel wears down, it is, of course, necessary to move the work toward the wheel. The mechanisms which carry and which operate the work are all mounted on a horizontally movable slide, and this slide is adapted to be operated by a worm turned by a hand crank. The crank is provided with a vernier scale which enables the operator to give the work a very fine adjustment with relation to the grinding wheel.

*Frames.*

The entire machine is supported by a hollow base 30 (Fig. 1), of cast iron or any other suitable material. This base is rectangular in form and a portion of the mechanism is mounted inside thereof. On the upper front portion of the base 30 is conveniently formed, a horizontally extending way, including rails 31 (Fig. 8) which support a laterally movable slide 32. This slide carries the grinding wheel spindle 104. To the right of the slide 32, as viewed in Fig. 1, there is a laterally movable slide 33, which will be known herein as the right-hand work slide. This slide (Fig. 9) embraces and is supported by the same rails 31 and carries the right-hand work spindle and other mechanism which cooperates therewith, to be later described. To the left of the grinding wheel slide 32, as viewed in Fig. 1, is a slide 34 similar to the right-hand work slide 33 and embraces the rails 31. This slide 34 carries the left-hand work spindle and the mechanism cooperating therewith. Extending upwardly from each of the slides 33 and 34 is a bracket 35 to support the stock in vertical position. A depending supporting arm 37 pivoted at its upper end to the opposing face of each of these brackets 35 carries a work guiding tube 36. This arrangement is provided so that a new piece of stock can be inserted easily.

*Main driving mechanism.*

Figure 7:
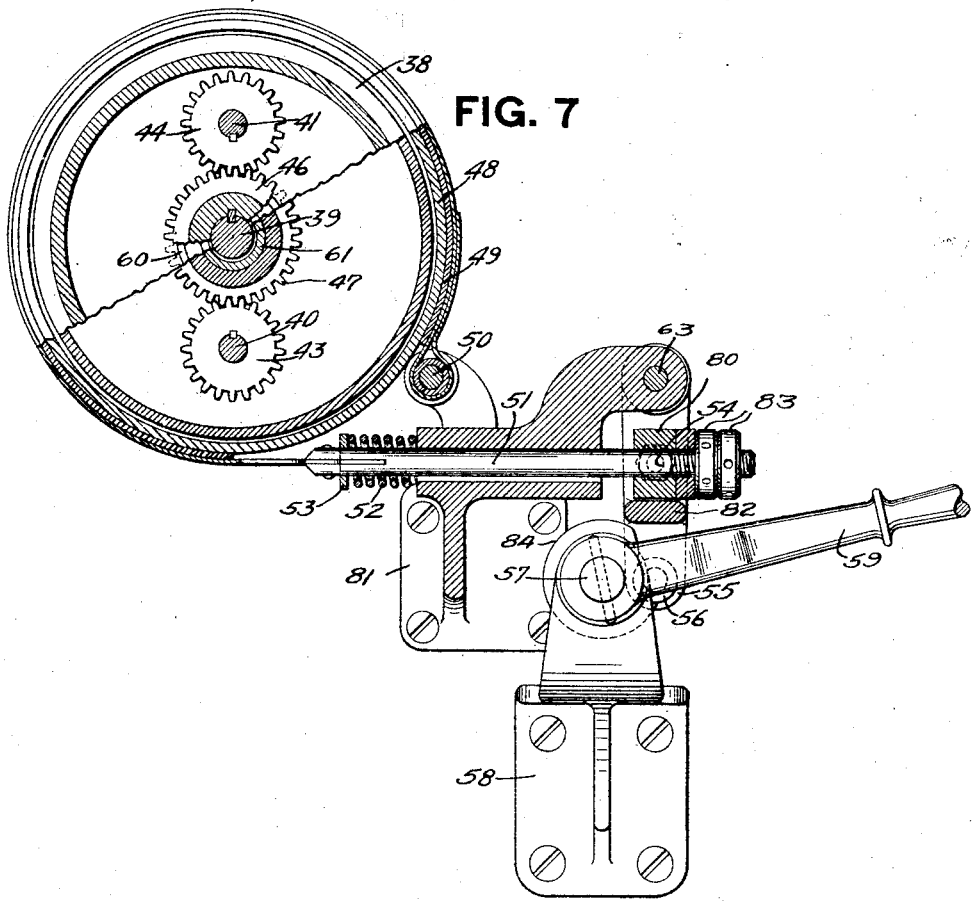
Fig. 7 is a sectional view, partly broken away, of the planetary gear mechanism, together with the brake which cooperates therewith.

The machine is adapted to be driven from any convenient source of power, through a belt which passes around a pulley 38 (Figs. 4 and 5), loosely mounted on a bearing 60 surrounding the hub of a gear 47, mounted to rotate on a bearing 61, encircling a shaft 39 journalled in the base 30 of the machine. Mounted in bearings extending transversely through the web of the pulley 38 are two short shafts 40 and 41 (Figs. 5 and 7). The upper shaft 41 carries a pair of planetary pinions 44 and 45, one on each side of the web and the lower shaft 40 carries a pair of planetary pinions 42 and 43 identical with the pinions 44 and 45. The planetary pinions 42 and 44 both mesh with a gear 46 which is keyed to the shaft 39 on one side of the web of the pulley. The planetary pinions 43 and 45 mesh with a gear 47, on the opposite side of the web, the gear 47 being loose on the bearing 61 which supports one end of the shaft 39. A key 62 secures a drum 48 to the hub of the gear 47. Surrounding the drum 48 is a brake band 49 of any suitable material. In its normal position the bank 49 (Fig. 7) is contracted about the drum 48 and holds it against rotation. This holds the gear 47 stationary, as this gear is fast with the drum 48. As the shafts 40 and 41 are supported by the pulley 38, they constantly revolve with this pulley, and the planetary pinions 43 and 45 roll over the teeth of the gear 47 which is held stationary. The gear 46, however, is keyed to the power shaft 39, and so long as the gear 47 is held stationary, the planetary pinions 42, 43, 44 and 45, cause the gear 46 and the power shaft 39 to rotate, and drive the machine in a manner which will be presently described.

The brake band 49 (Fig. 7) is anchored at one end on a stud 50 which is supported by a projection of the machine frame. At its other end, the brake band is riveted to one end of a rod 51, which passes through and is adapted to move laterally in an opening in the machine frame. The inner end of the rod 51 is surrounded by a spring 52 compressed between a collar 53, carried by the rod, and the frame. At its right-hand end, as viewed in Fig. 7, the rod 51 passes through a transversely-extending bar 80 swivelled at its opposite ends, as at 54, in a rocking bail pivoted at 63 to a fixture 81 secured to the side of the base 30. The rocking bail includes the arms 55 which support the transverse bar 80, and a brace 82. That end of the rod 51 which protrudes through the hole in the transverse bar 80, is threaded. Adjusting and locking nuts 83 on the threaded end of the rod, bear against the transverse bar 80, and admit of varying the tension of the spring 52 to take up wear of the brake and to maintain the desired brake pressure. Fast on a shaft 57, journalled in the frame of the machine at one end, and in a bracket 58 at the other end, is a control lever 59 which is moved clockwise to start the machine. Clockwise movement of the control lever 59 rotates a cam 84 on shaft 57 which cooperates with a roller 56 on the rocking bail to rock the bail counter-clockwise about its pivot 63, thereby moving the rod 51 to the right and contracting the brake band 49 about the drum 48. As above noted, so long as this brake drum is held against movement, the driving mechanism operates. When the lever 59 is swung to the position shown in Fig. 7, however, the cam 84 on the shaft 57 permits the roller 56 and the rocking bail 55 to swing to the left, due to the tension of spring 52, to release the brake band 49 and permit the drum 48 to rotate. It can be seen that if the drum 48 is permitted to turn, the gear 47 turns, and the planetary pinions 42, 43, 44 and 45 do not drive the gear 46 or the machine.

The adjustment provided on the right-hand end of the rod 51 (Fig. 7) for increasing or lessening the normal tension put on the brake band insures the maintenance of sufficient tension to prevent the rotation of the drum 48.

It has been above described how the power shaft 39 receives its rotation. Keyed to the right-hand end (Figs. 5 and 6) of the power shaft 39 is a pinion 65 which meshes with a gear 66 keyed to a shaft 67 journaled in the machine frame 30. Also keyed to the intermediate shaft 67 is a smaller gear 68 which meshes with a gear 69 loosely mounted on a stud 70 (Figs. 6 and 18). The intermediate shaft 67 is removably mounted in the machine frame as shown in Fig. 5 so that gears of different sizes may be used. The projecting head of the stud 70 slides in a T-slot formed in a curved way or track secured to the frame 30. The stud can be secured at any point in the way or track by a nut 64. The gear 69 meshes with a gear 71, which is keyed to a shaft 72 supported by the machine frame 30. This shaft 72 is the main cam shaft of the machine, and is best shown in Fig. 4. As shown in Fig. 4, and also in Fig. 6, the shaft 72 has a pair of gears 73 and 74, one keyed on each end thereof. The mechanisms driven by the gears 73 and 74 are identical, and therefore, the left-hand group only need be described. The gear 73 cooperates with a spiral gear 75 which in turn is fast on a shaft 76 (Figs. 4 and 6) supported by the machine frames. The gear 75 meshes with a spiral gear 77 fast on a shaft 78, also supported by the machine frames. At its forward end, the shaft 78 (Figs 1, 6, 10 and 12) carries a cam disk 79 which operates various portions of the mechanism, as hereinafter described.

*Work spindle drive.*

The means for driving the work spindles is best shown in Figs. 2ᴮ, 4, 5 and 9. It will be remembered that the pulley 38 (Fig. 5) is constantly driven. This pulley has a portion 85 integral therewith, extending toward the left, as viewed in Fig. 5, which carries a sprocket wheel 86, connected by means of a chain or other flexible connection 87 to a similar sprocket wheel 88 keyed on a drive shaft 89, which extends all the way across the front of the machine. The shaft 89 rotates in suitable ball bearings 90 in the machine frame, as shown in Fig. 5, whenever the pulley 38 is driven. The sprocket wheels 86 and 88, and the chain 87, are all contained in an oil proof housing 91, bolted to the machine frame 30. Fast on the shaft 89, adjacent to each of the work spindles, is a spiral gear 92 adapted to mesh with a spiral gear 93 conveniently formed on a tube 220 constituting a part of the spindle. It can be seen from Figs. 2ᴮ, 4 and 9 that the work spindle is continuously rotated throughout the operation of the machine by means of the above described connections.

*Grinding wheel spindle.*

Figure 8:
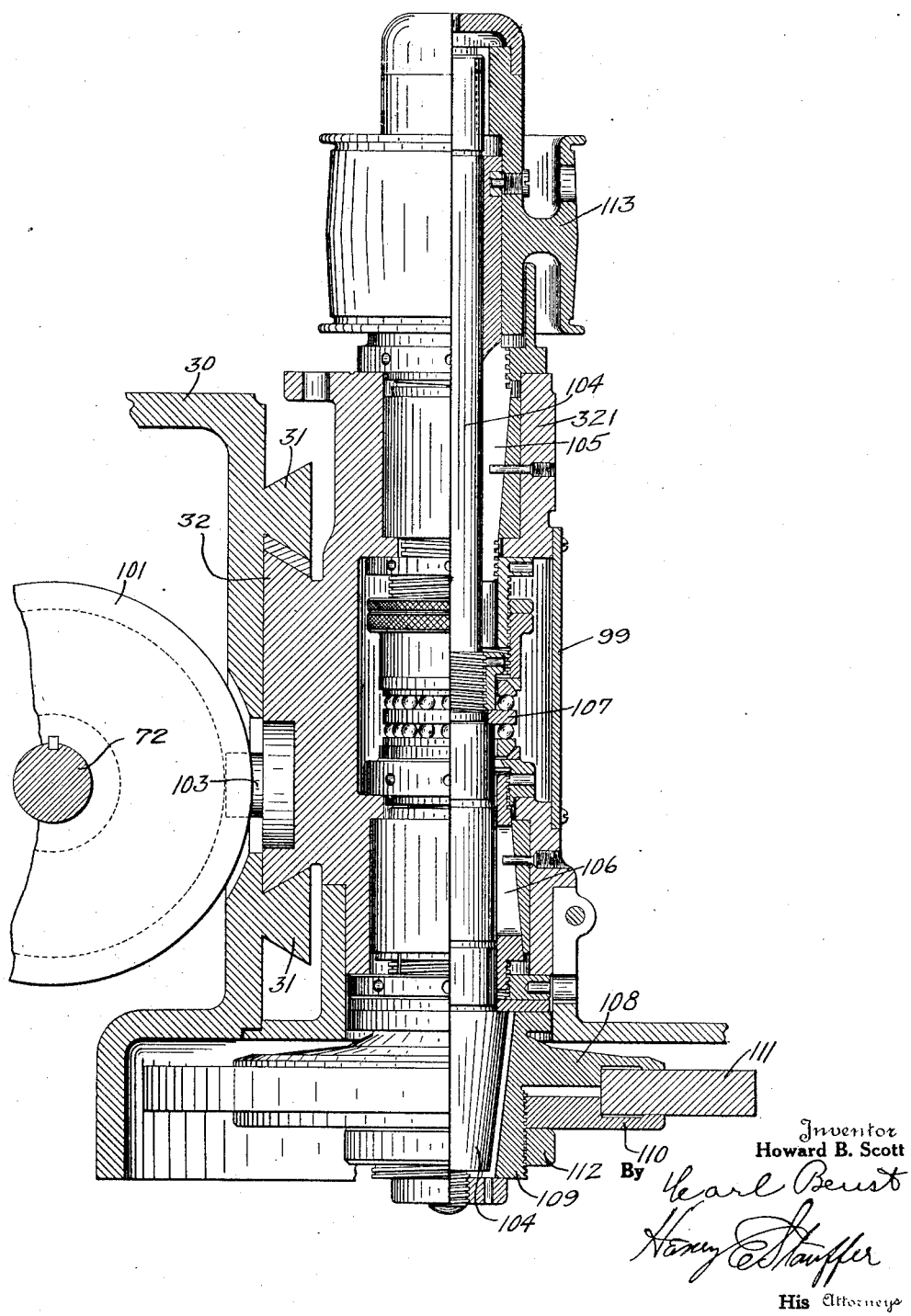
Fig. 8 is a view in side elevation, partly in section, of the grinding wheel spindle.

The grinding wheel spindle is best shown in Fig. 8. Projecting from the machine frame 30 is the pair of rails 31. Shiftably mounted between these rails is a slide 32, which carries the tubular casing 321 containing the grinding wheel spindle. This slide is movable laterally of the machine a short distance in each direction, and is shifted by the following mechanism. Fast on the main drive shaft 72 of the machine (Figs. 4, 8 and 18) is a large cam 101 which has a slot 102 cut in its periphery. Projecting into the slot 102 is a stud 103 mounted in the slide 32 for the grinding wheel spindle. It can be seen from Fig. 18 that when the cam 101 is rotated, the groove 102 shifts the stud 103, and therefore, the slide 32 laterally, first in one direction and then in the other. The stud or follower 103 fits loosely in the cam groove 102 in cam disk 101 to control the grinding wheel spindle. The work performed by machines of this class is often of a very precise nature, and in order to accurately control grinding tool and prevent play thereof, there are provided two powerful coil springs 119 (Fig. 18) one at each end of the travel of the slide 32. The spring on the left-hand side is shown in full. Each spring is carried by a rod 120 projecting from the main frame 30. The slide 32 carries a stud 121 through which extends the inner end of the rod. When the slide 32 moves in either direction from a point midway of its path of travel, the corresponding spring 119 is compressed, to hold the stud or follower 103 snugly against the working face of the cam slot 102.

The grinding wheel spindle itself includes a vertically mounted shaft 104 (Fig. 8) rotatable in bearings 105 and 106 arranged interiorly of the tubular casing 321. The shaft 104 has an annular flange 107 clamped thereon to rotate therewith, and this flange forms the center member of a double set of ball bearings, which are conventionally mounted in the casing 321. These ball bearings support the spindle and take up the end thrust thereof. Access to the bearings can be had by removing a cover plate 99. At its lower end, the spindle shaft 104 is tapered, on which tapered portion is keyed a disk 108. The disk 108 has a downwardly extending threaded portion 109 on which is screwed a disk 110 the same size as the disk 108. Between these disks a grinding wheel 111 of any suitable material is clamped. The lower disk 110 is unscrewed from the upper disk 109; the grinding wheel is slipped over the lower end of the spindle; and the disk 110 is then screwed up tight to hold the wheel rigidly in place. A threaded collar 112 is used beneath the disk 110 for locking the removable disk in place.

The bearings 105 and 106 are conventional bearings, used in all spindles of this type, and are provided with adjustments for compensating for wear in the bearings, and also are adjustable vertically to change the position of the grinding wheel 111 with relation to the work. At its upper end, the spindle has keyed to it a pulley 113 (Figs. 1, 2ᴮ and 8) around which passes a belt 114 for driving the spindle. The belt 114 passes toward the rear of the machine and under two pulleys 115 mounted on a shaft 116 supported by a U-shaped bracket 117 pivotally mounted on the frame 30 of the machine. This construction is used so that when the grinding wheel spindle is shifted to right and left by the cam 101, the working conditions of the belt will remain unchanged. The drive for the grinding wheel spindle is entirely independent of the main driving mechanism of the machine and is operated by independent means, which are not shown herein. A grinding fluid is sprayed on the work from a tube 118 (Fig. 2ᴮ).

*Mechanism for dressing the grinding wheel.*

After the machine has been operated for a period of time, it will become necessary to dress the periphery of the grinding wheel, in order that the work may be turned out in an accurate manner. This dressing operation is also necessary when it is desired to change the angle of the taper with which the pin is ground. In order to accomplish this function, a mechanism is provided which is attached to the machine and is best shown in Figs. 2ᴮ and 3. The grinding wheel dressing mechanism is mounted on a projecting table 123 which extends toward the front from the main frame 30. Mounted on the projecting table 123 is a track 124 with which a slide 125 cooperates. The slide 125 has two lateral extensions 126 and 127 formed one on each side of the slide. The extensions 126 and 127 have semi-cylindrical bearings 128 formed therein, in which are seated the oppositely projecting trunnions 129 of a tubular holder 130 which carries the dressing tool. Retaining caps 122 enclose the upper halves of the trunnions. Suitably supported screws 131 and 132 cooperate with the ends of the trunnions 129 so that the tool may be given a fine lateral adjustment. The trunnions 129 form a pivot for the dressing tool holder 130. Extending forward and rearward from the holder 130 are two arms 133 and 134 (Fig. 2ᴮ). These arms may be integral with the holder 130, and each arm carries a set screw 135 adapted to contact with the hardened wear resisting blocks on the slide 125. It is evident that if one of the set screws 135 is loosened, and the other tightened, the dressing tool holder will be rocked on the trunnions 129 as a pivot to give the tool any inclination that may be desired. Cooperating with a threaded portion of the track 124 is a worm 136 which has fast to its forward end a hand wheel 137 by which it may be turned. The hand wheel 137 is provided with a vernier scale 138 so that a very fine adjustment of the tool may be attained in the front and rear directions. The tool itself comprises a shank 139, at the lower end of which is mounted a diamond cutter 140. The shank 139 is loosely mounted in a sleeve 141 inserted within the holder 130. At its upper end, the shank 139 is drilled out and tapped to receive a worm 142 journaled in a bearing 143 secured to the upper end of the holder 130. At its upper end, the worm 142 carries a hand wheel 144 by which it may be rotated. A V-shaped groove 145 is cut lengthwise of the shank 139, and cooperating with this groove is a key plate 146 loosely mounted on studs 147 projecting from the holder 130. Cooperating with the right-hand edge of the key plate 146 is a set screw 148 by which the inner edge of the key plate may be held in the groove 145. The purpose of this key plate is to prevent rotation of the shank 139, but at the same time, to permit the shank to move up and down when the worm 142 is turned. At a point opposite the peripheral groove 145 the shank 139 carries a stud 149 which projects through a slot cut in the side of the sleeve 141. This construction is also for the purpose of preventing rotation of the shank 139. It can be seen from the above description that the dressing tool may be moved forward and back from the grinding wheel 111 by the hand wheel 137, and may be raised and lowered by the hand wheel 144, and may be given any desired inclination from the vertical by means of the set screws 135. With this construction it is possible to dress the grinding wheel at any desired angle whenever it becomes necessary.

*Work spindles.*

The spindles which hold the stock during the grinding operation are well known in machines of this class, and the two spindles used herein are identically the same. It is thought, therefore, that a description of one of these spindles will be sufficient for an understanding of their use in connection with the present invention.

*Chuck mechanism.*

The stock passes through rotatable spindle mechanism well known in the art, and mounted in bracket arms (Fig. 9) conveniently formed integrally with and projecting forwardly from the respective work slides 33 and 34 (Fig. 1).

As these work spindle mechanisms are identical, a brief description of one will suffice.

The stock 157 (Fig. 9) passes through a hollow feed rod 158 forming the core of the spindle mechanism. The feed bar 158 is reciprocable in a sleeve 162. The lower end of the feed bar is split to form spring fingers to grip the stock passing therethrough.

A conical spring collet 159 is mounted in line with the lower end of the feed bar, a screw cap 160 operating to secure the collet in the lower end of a rotatable tube 161 mounted in a bearing 221, it being understood that the collet forms no part of the bearing surface. The stock passes from the feed bar fingers to and through the collet.

Control of the collet to release and clamp the stock is effected as follows: The lower end of the sleeve 162 contacts with the upper end of a hollow feed nose 162¹, the lower end of which nose is tapered to surround the conical spring collet 159 to constrict the latter.

The upper end of the sleeve 162 is slotted at opposite points above the upper bearing 222 of the spindle mechanism to loosely accommodate pressure fingers 163, the inner longitudinal edges of which lie against the feed bar 158.

The extreme upper end of the sleeve 162 is threaded to accommodate lock nuts 151 which form an abutment against which the upper end of a cylindrical cage 166 contacts. The lower end of the cage is flanged to form a fulcrum for the toes of the outwardly projecting feet 165 at the lower ends of the pressure fingers 163, the heels of such feet resting on a flange 162² of the sleeve 162.

The cage is longitudinally slotted to accommodate the cammed upper ends of the pressure fingers 163. A control ring 164 suitably supported from an arm 168 fast on the releasing shaft 167 extending across and journaled in the machine frame, encircles and contacts with the cam-shaped upper ends of the pressure fingers 163. The arm 168 is formed with an opening 169, in which the ring 164 lies. The feed bar 158 extends through the opening to a point above the arm 168.

Figure 9:
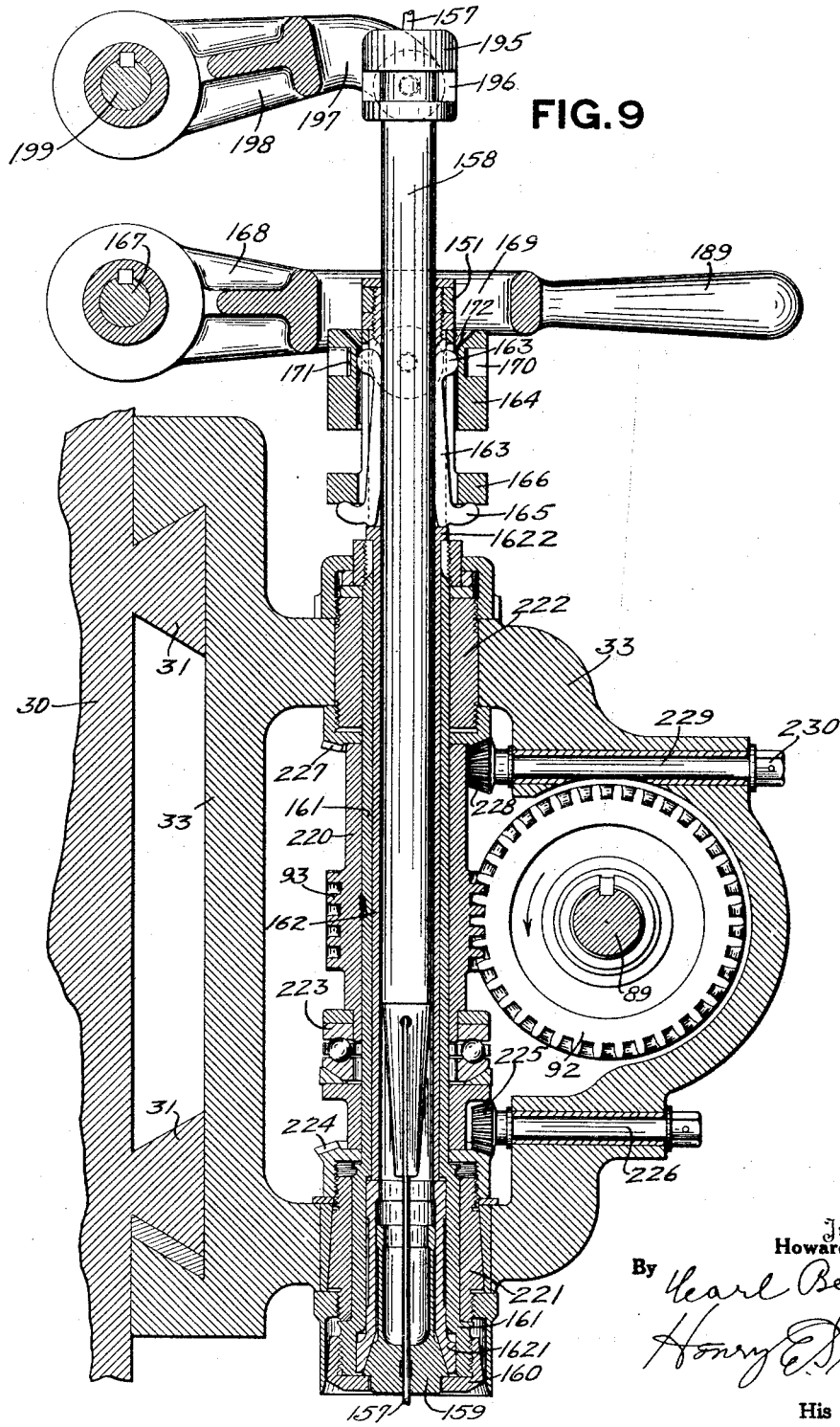
Fig. 9 is a detail sectional view of one of the work spindles.

Normally, the arm 168 supports the control ring 164 in the raised position shown in Fig. 9, to hold the upper ends of the pressure fingers closely against the feed rod 158, with the heels of the feet 165 at the lower ends of the fingers, pressed downwardly against the flange 1622 of the pressure sleeve 162. When in this position, the fingers hold the sleeve 162, and feed nose 161 in their lowest positions, the tapered end of the feed nose riding on and constricting the conical spring collet 159 to cause it to firmly grip the stock.

Release of the collet to permit the stock to feed or advance a new supply to the grinding tool, is effected from a cam 188 on the main cam shaft 72, (Figs. 2ᴬ, 17 and 18). The walls of a cam groove 187 in the side of the cam disk 188 operate to rock a bell crank 186, 184 journaled on a transversely extending rod 185. The free end of arm 184 of the bell-crank is forked to embrace the lower end of a cylindrical enlargement 180 formed on a rod 181. The enlargement 180 slides in a guide bearing 190 in the frame of the machine, and at its lower end is transversely grooved, as at 182, to form seats in which slide the blocks 183 pivotally connected to the respective ends of the forked portion of bell-crank arm 184. The lower end of the connecting rod 181 slides in a guide socket 207 (Fig. 2ᴬ). The upper end of the enlargement 180 of the connecting rod is transversely grooved, as at 179 (Fig. 17) to form a seat for a sliding block 178 pivotally connected to the rear end of an arm 177 which, for present purposes, may be a rearward extension of the arm 168 fast on the shaft 167 and to which arm the control ring 164 is connected.

Rotation of the shaft 72 and cam 188 rocks the bell-crank 186, 184 first counter-clockwise, and then clockwise. Counter-clockwise rotation of the bell crank lifts the connecting rod 181 and rocks arms 177, 168 clockwise to force the control ring 164 downwardly relatively to the cylindrical cage 166 and the pressure fingers 163 until the upper inner beveled edge 172 of the control ring 164 clears the cam-shaped heads of the fingers 164, whereupon the compressing feed nose 1621 is free to release itself from the conical collet 159. As a result, the feed nose, due to its resilient nature, rises slightly and pushes the sleeve 162 upwardly, such travel of the feed nose and sleeve being only a few thousandths of an inch, but sufficient to enable the collet to expand and release its grip on the stock.

The flange 1622 of the sleeve 162 presses upwardly against the heels of the feet 165 on the fingers 163, to afford room for the relief of the feed nose 1621, and rocks the fingers outwardly on the fulcrums formed by the contact of the toes of the feet with the flange on the lower end of the cage 166.

The stock may now be advanced or fed to bring a new piece thereof opposite the tool. Clockwise rotation of the bell crank 186, 184 reverses the direction of travel of the arm 168 to raise the control ring 164, the flaring upper end 172 of which forces the cam-shaped heads of the fingers 163 radially inward towards the feed bar 158. The fingers 163, pivoting on their fulcrums, force the heels of their feet against the flange 1622 on the sleeve 162 and drive the sleeve downwardly, together with the feed nose 1621 to cause the latter to ride up on the conical head of the collet and contract the fingers thereof upon the stock. The control ring 164 remains in effective position to prevent the pressure fingers 163 from yielding to the tendency of the feed nose to release itself from the collet.

The control ring 164 is connected to the arm 168 by a split ring 170 fitting in an annular groove in the ring and pivoted to bosses (Fig. 2ᴮ) formed on diametrically opposite sides of the opening 169. The cam groove 187 in the cam disk 188 (Fig. 18) is made wide enough to permit the arm 186 and its connecting mechanism to be moved manually, which operation is necessary when new stock is to be inserted in the machine. This manual operation is performed by means of a hand lever 189 which is made integral with the arm 168. It is apparent that moving the lever 189 downwardly and then upwardly will operate the mechanism above described to release the chuck and then cause it to grip the stock in the same manner as is done by the cam 188.

The cams 188 operate alternately upon the work spindles, so that while the stock is being advanced or fed through one spindle, the tool is operating on the stock in the other spindle.

*Work feeding means.*

After the pin or other work is ground and cut off, and the collet 159 is opened, means are provided for feeding the stock 157 downwardly in order to bring a new portion thereof into position to be operated upon, and this means will now be described. The stock 157, as has been mentioned before, runs downwardly through a hole drilled in the middle of the feed rod 158. At its lower end, this rod is tapered and split, and this split portion is adapted to engage the stock frictionally. When it is desired to feed the stock down, the rod 158 is lowered by mechanism which will be presently described. The stock is advanced by the feed rod 158 to a position below its operating position. It is then raised to operating position by the work stop 251.

A means for lowering and raising the feed rod 158 to feed the stock will now be described. Fast on the upper end of the feed rod 158 is a head 195 (Fig. 9) which has two cut-away portions therein, into which project blocks 196 carried by the bifurcated end 197 of an arm 198 keyed to a feed shaft 199 supported by the machine frame 30. Also keyed to the shaft 199 (Figs. 2ᴬ and 2ᴮ) is a rearwardly projecting arm 200 connected to the upper end of the connecting rod 181 by a pair of blocks which cooperate with slots formed in a head 201 carried by the connecting rod 181. Near its lower end, the connecting rod 181 has a transversely slotted collar 202 the slots forming seats for the slidable blocks 203 carried by the forked end of an arm 204 loose on a rod 205 supported by upwardly extending brackets 206 of the frame of the machine. Rigid with the arm 204 is an upwardly projecting arm 208, which, at its upper end, carries a roller 209 entered in a cam groove 210 (Fig. 2A) formed in the side of the cam 188, previously mentioned in connection with the collet operating device. Also integrally connected to the arm 208 and arm 204 is a rearwardly-extending arm 211, which at its left-hand end, as viewed in Fig. 2A, is hooked as at 212. Suspended from the end of this arm, by a rod 214, is a weight 213. This weight is in the nature of a counterbalance for the connecting rod 181 and the mechanism carried thereby, and relieves the strain on the cam shaft 72 and cam 188. It can be seen that when the main cam shaft 72 is rotated, the cam groove 210 rocks the arms 208 and 204 first counter-clockwise and then clockwise to their normal positions. During the counter-clockwise movement of these arms, the connecting rod 181 is raised, thereby rocking the arms 200, feed shaft 199 and arm 198 clockwise in order to lower the feed rod 158 while the collet 159 has released the stock, and thereby move the stock downwardly until it comes in contact with the stop. The collet is then operated by the cam groove 187 (Fig. 17) to grip the stock in its lowered position, and when the cam groove 210 operates to reverse the movement of the above-described parts, the feed rod 158 will simply slide upwardly over the stock to its upper position.

*Means for rotating stock.*

The means for rotating the stock as it is held in the collet has been partially described in connection with the driving mechanism. It will be remembered from this description that the chain 87 (Fig. 5) rotates the shaft 89 which carries the spiral gears 92 (Fig. 9) engaging with spiral gears 93. These gears 93 are fast on the respective tubes 220 (Figs. 2B and 9) each of which is, in turn, keyed to a hollow shaft 161 surrounding the sleeve 162, previously described. The hollow shaft 161 rotates its collet 159 and its sleeve 162, due to the pressure of the collet against the cap 160 which is fast on the sleeve 161. Each sleeve 161 has a bearing 221 at its lower end and a bearing 222 at its upper end, these bearings being supported by the work slides 33 and 34 respectively. The end thrust of each spindle is taken by a ball bearing 223 mounted in the usual manner. The lower bearing 221 is adjustable for wear by a beveled toothed portion 224 formed on its upper end which cooperates with a beveled pinion 225 fixed to a short shaft 226 journaled in the bracket arm and having a hexagonal nut fast on its outer end. The same kind of adjustment for the upper bearing is provided with a beveled portion 227 cooperating with a beveled pinion 228 fast on a shaft 229 and provided with a nut 230 for adjusting.

*Adjustment of work slides.*

The work slides 33 and 34 are adjustable laterally of the machine to compensate for wear on the grinding wheel, and also to take care of different sizes of stock. This adjustment is accomplished in the following manner, and as the mechanism for adjusting the work slides is identical for both sides, a description of one of them will be sufficient.

Bolted to the main frame 30 of the machine is a housing 235 (Fig. 1), in which a shaft 236 is supported in suitable bearings (Figs. 1 and 16). Pinned to the front end of the shaft 236 is a hand crank 237 by which it may be turned. At its rear end, the shaft 236 carries a worm 238 which cooperates with a worm wheel 239 fast on a shaft 240 mounted in suitable bearings in the housing 235. This shaft 240 is connected to a shaft 241 by means of a coupling 242 which is contained in a small housing 243. The shaft 241 carries a worm 244 which cooperates with a threaded portion 245 of the work slide 34. It can be seen from Fig. 16, that when the hand crank 237 is rotated, the worm 238, worm wheel 239, shaft 240, coupling member 242, shaft 241 and worm 244 all rotate to cause the work slide 34 to move laterally of the machine for the purpose above mentioned. In order that a fine adjustment of the slide may be had, the hand crank 237 is supplied with a vernier scale 246.

*Work stop.*

It has been previously mentioned herein that a member known as the work stop is provided, which is for the purpose of determining the length of the pin to be ground, and also holding the lower end of the pin during the grinding operation. This work stop is shown in Figs. 1, 10, 13 and 14. The lower end of a vertically disposed shaft 248 is mounted in a slip bearing carried by a bracket 247 projecting from the work slide 34. At its upper end, this shaft is guided in a bracket 249 also extending from the work slide 34. Near its lower end, the shaft 248 has pinned thereto a laterally extending arm 250 which carries the work stop. The work stop includes a tapered member 251 which snugly fits in an arbor 252 supported by a socket member 253 which is in turn carried by the bracket or arm 250. An annular filler plate 260 rests on the enlarged head of the socket member 253 to which it is fastened, and overlies a flange on the arbor 252, thereby holding the arbor 252 in place. A beveled collar 254 rests on top of the annular plate 260 and serves to prevent the grinding dust from entering the work stop. The socket member 253 is provided with four set screws 261 which cooperate with the arbor 252 and by means of which this arbor and the work stop 251 can be accurately adjusted relatively to the work. The vertical adjustment of the work stop is accomplished by means of a screw 255 which has a flat head 256 projecting into a notch 257 in the lower end of the socket member 253. The adjusting screw 255 operates in a threaded portion of the bracket arm 250, and when this screw is turned it is evident that the socket member 253 and the work stop will be vertically adjusted to any position. A means is also provided for easily removing the work stop 251 from the arbor 252 at any time. Extending upwardly through the bottom of the hollow socket member 253 is a knock-out rod 258 which has a slot 259 cut therein, through which projects a pin 260 across the bore of the socket member. The rod has a flattened head 261 at its lower outer end, and when it is desired to remove the work stop, the head 261 is given a sharp tap with the hammer, to drive the knock-out rod against the inner end of the work stop to dislodge the latter and facilitate its removal.

The work stop is automatically lowered, after the grinding operation is finished, to permit the finished pin to drop out of operating position when it is cut off. After this downward movement, the work stop is automatically returned to its normal upper position. During this movement, it will contact with the end of the stock. Means for raising and lowering the work stop is shown best in Fig. 10, and will now be described.

Near its upper end, the shaft 248 carries a collar 265 (see also Fig. 14) which has a circumferential groove 266 cut therein. A tenon 267, formed on an arm 268, projects into the groove 266. The arm 268 is fast on a shaft 269 carried by two brackets 270 and 271 projecting from the portion 245 and projection 249 respectively, of the work slide 34 (Figs. 10 and 16). Also fast on the shaft 269 is an arm 272 which carries a roller 273 cooperating with a cam groove 274 (Figs. 4 and 10) formed in the periphery of the cam disk 79 carried by the forwardly projecting shaft 78 in the work slide 34. As previously described, this cam disk 79 is rotated by the main cam shaft 72, and the shape of the cam groove 274 is such that the shaft 269 is rocked counter-clockwise, as viewed in Fig. 13, and through the connection formed by the collar 265 and arm 268, lowers the work stop a sufficient distance to permit the finished pin to drop downward. After the pin is out of the way, the cam 79 raises the work stop into its normal position. When the work stop is lowered as above described, the action of the shaft 248 is against the tension of a coil spring 275, which surrounds the shaft 248 and is compressed between a flange 276 on the shaft 248 and the bottom of a cylindrical seat in the work slide 34.

Means is provided herein for slightly changing the time of the cam 79 in case its action should be delayed or advanced when operating on different kinds of work. The side face of the cam 79 carries two laterally projecting studs 277, the outer ends of which are cut away to form flat faces against which press the lower ends of two cap screws 278 carried by oppositely projecting arms 279 fast to the shaft 78. The cam 79 is driven by means of the arms 279 and cap screws 278, and it is evident that should it be desired to change the time of the cam slightly, it can be done by loosening one of the cap screws 278 and tightening the other screw.

When the stop is lowered and the finished pin is permitted to drop, it falls onto a chute 280 (Fig. 1) supported in the base of the machine, and is conducted by this chute to a receptacle 281 supported by a bracket 282 on the outside of the machine.

The projecting end of the work stop 251 is made substantially semi-circular (Fig. 10) to enable the grinding tool to closely approach the work 157 in operating thereon.

In case it becomes necessary to change the work stop for one of a different size, or it is mereby desired to inspect this mechanism, means is provided for shifting the work stop into an accessible position. Secured to the shaft 248 (Figs. 1 and 10) is a member 283, which has fast thereto an arm 284 carrying a handle 285 in a position where it may be readily grasped by the operator. When it is desired to remove the work stop for inspection, the operator grasps the handle 285, and by means of the arm 284 and member 283 rotates the shaft 248, and therefore, the bracket 250 in a clockwise direction, as viewed from above. This brings the work stop out toward the front of the machine, where it is readily accessible. The collar 265, with the groove 266, rotates without changing its relation to the tenon 267 of the arm 268, when the work stop is brought to the inspection position.

As shown in Fig. 1, the work stop is also provided with a pivoted cover plate 286 which normally encloses the work while it is being ground. This cover plate is pivoted at 287 on the work slide 34 and moves with this slide at all times. When it is desired to inspect the work, the cover plate 286 may simply be swung back manually, thereby exposing the mechanism to view.

Cut-off mechanism.

The cut-off mechanism is shown in Figs. 1, 11, 12 and 15. Secured to the work slide 34 is a guide rail 293 (Fig. 11), on which moves a slide 294. A holder 295 for the cutter is adjustably mounted on the slide 294 one end of the holder projecting beyond the slide 294 and having a bifurcated end 296 in which is supported a circular cutting tool 297, best shown in Fig. 15. This tool 297 has a notch cut therein and the cutting edge is formed at one corner of this notch. The tool 297 is rigidly held in place in the bifurcation 296 by means of bolts 298 which clamp the walls of the bifurcation together on the tool. Fig. 12 shows the tool in relation to the work. As shown in this figure, the grinding operation has been finished and the pin is ready to be cut off. When this point in the operation is reached, the slide 294 is moved toward the right (in Fig. 12) far enough to bring the cutter into contact with the rapidly rotating stock, to sever the pin from the stock. The slide 294 is advanced towards and retracted from the work by the following mechanism.

The slide has an extension 299, having a slot 300 formed therein. Projecting through and slidably along the slot 300 is a hollow, flanged stud 301 (Fig. 15ᴬ) which, on its forward end, is threaded to receive a nut 302 for clamping the stud 301 at any point in the slot 300. Extending into the hollow stud 301 is the shank of a pin 304 (Fig. 15ᴬ) which has an enlarged head 305 in which is cut a vertical groove 306. Fitted in the groove 306 is a square bar 307 seated in a complemental groove 308 in a depending arm 309, keyed to a short shaft 310 journalled in a bracket 311 on the work slide 34. Also keyed to the short shaft 310 is an upwardly extending arm 312, which carries at its upper end a roller 313 projecting into a cam groove 314 (Figs. 12 and 14) in the before-mentioned cam 79. It is evident that the rotation of the cam 79 will, due to the shape of the slot 314 therein, rock the arm 312 first counter-clockwise and then clockwise to its normal position. The counter-clockwise movement of the arm 312 will, through the shaft 310, arm 309 and squared bar 307, move the slide 294 to the right, as viewed in Fig. 12, a sufficient distance to sever the pin from the stock. The slide 294 will then be returned to the left, toward its normal position. It is evident that should the nut 302 be loosened, the member 301 and pin 304 may be slid vertically in the slot 300, with the squared groove 306 in the head 305 of the pin 304 still in engagement with the squared bar 307 on arm 309. This will give the slide 299 a greater or less movement, as may be desired to accommodate the device to different sized stock.

An arrangement is also provided for adjusting the holder 295 (Figs. 11 and 12) relatively to the slide 294 to take care of different sized cutting tools. This holder 295 is supported by two screws 320 which project through slots 321 formed in the slide 295. The holder 295 has a threaded opening in its left-hand end, as viewed in Fig. 12, and co-operating with this opening and passing through a flange 323 on the slide 294 is a threaded rod 322, which has a lock nut on each side of the flange 323. By loosening one of the lock nuts and tightening the other, the slide 295 may be moved laterally relatively to the holder 294.

Operation.

The machine is provided with two spindles in which the stock 157 is placed, after which, the machine is started by lowering the starting lever 59, (Fig. 7) which tightens the band 49 around the drum 48, thus causing the planetary gearing (Fig. 5) to rotate the drive shaft 89 and the two cam shafts 72 and 78.

When the machine starts, the grinding wheel 111 is shifted by the cam 101 for slide 32 to grind the end of one of the pieces of material. After completing the grinding operation on this one piece of material, the grinding wheel is automatically shifted into position to grind the end of the other piece of stock, only one grinding wheel being provided in the machine. While the grinding wheel is operating upon the second piece of stock, the cutter 297 adjacent the first piece of stock is automatically shifted to cut off the finished end of the first piece of stock, a separate cutter being provided for each stock spindle. The machine automatically shifts the grinding wheel from one piece of stock to the other to grind one piece, while the cutter is automatically controlled to cut off the finished end of the piece of stock just previously operated upon by the grinding wheel. Thus, the machine simultaneously grinds one dowel pin and automatically cuts off a finished dowel pin from the other piece. A chute is provided to convey the finished dowel pin into the proper receptacle, after which the stock is automatically lowered against the adjustable stop 251.

When the finished dowel pin is cut off the stop 251 is lowered to permit the dowel pin to fall into the conveying chute. The stop is still in its lowermost position when the stock is fed against it, but before the grinding wheel is again shifted to its grinding position, the stop is raised to adjust the length of the stock to be operated upon by the grinding wheel. The collet 159, of course, releases the stock prior to the feeding of the stock by the feed bar 158, and remains in released position as the stop 251 presses the stock upwardly to attain the proper length, the spring fingers of the feed bar 158 permitting the stock to slide upwardly therethrough. The collet is automatically closed after the stock is in proper position.

The angle of the grinding wheel can be changed or dressed by a diamond point dressing tool 139 provided for that purpose. The diamond point dressing tool is adjustable to any angle to permit dressing the grinding wheel to any angle.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In a machine adapted to grind dowel pins, a grinding wheel, the combination of a grinding wheel carriage, work holding members, means for bringing said grinding wheel alternately into grinding relation with said work holding members, and means for cutting off said work automatically after it has been ground, said last-mentioned means adapted to cut off the work in one holding member while the grinding wheel is grinding the work in the other holding member.

2. In a machine adapted to grind dowel pins, the combination of a grinding wheel carriage and a grinding wheel, work holding members, means for bringing said grinding wheel alternately into grinding relation with said work holding members, means for cutting off said work automatically after it has been ground, said last-mentioned means adapted to cut off the work in one holder while the grinding wheel is grinding the work in the other holder, and means for releasing said work holding members when said cutting operation is completed.

3. In a machine adapted to grind dowel pins, the combination of a grinding wheel carriage and a grinding wheel, work holding members, means for bringing said grinding wheel alternately into grinding relation with said work holding members, means for cutting off said work automatically after it has been ground, said last-mentioned means adapted to cut off the work in one holder while the grinding wheel is grinding the work in the other holder, means for releasing said work holding members when said cutting operation is completed, and means for feeding said work through said holding members while they are released.

4. In a machine adapted to grind dowel pins, the combination of a grinding wheel carriage and a grinding wheel, work holding members, means for bringing said grinding wheel alternately into grinding relation with said work holding members, means for cutting off said work automatically after it has been ground, said last-mentioned means adapted to cut off the work in one holder while the grinding wheel is grinding the work in the other holder, means for releasing said work holding members when said cutting operation is completed, means for feeding said work through said holding members while they are released, and means for limiting the length of feed of said feeding means.

5. In an automatic grinding machine, the combination with a frame; a cam shaft; and driving means therefor; of a series of separate slides mounted in alinement on the frame; work-holding mechanism mounted on the end slides of the series; means to adjust either end slide relatively to the other; tool-holding means mounted on a slide intermediate the work-holding mechanisms; a cam on the shaft to reciprocate the tool-holding means and its slide back and forth, to operate alternately on the work carried by the respective work-holding mechanism; cam-controlled means adapted to release the work-holding mechanisms, feed the work, and reenable the work-holding mechanisms to clamp the work; cam-controlled means to arrest the work as it advances and to correctly position the work relatively to the tool; and means to cut off the completed article.

6. In an automatic grinding machine, the combination with a frame; and drive means mounted therein; of a plurality of adjustable work-holding mechanisms; means to alternately release the work-holding mechanisms, advance the work, and re-enable the work-holders to grip the work; means to arrest the work on its advance; and a tool holder and tool shiftable alternately into effective relation with the work in the respective work-holders; and means to cut off the completed article.

7. In an automatic grinding machine, the combination with a frame; and a drive shaft mounted therein; of a work-holding mechanism adapted to grip the work; means to release the grip of the work-holder on the work, advance the work and re-enable the work holder to grip the work; a tool holder having a tool to operate on the work; means to arrest the work on its advance and to restore the work to proper position relatively to the tool prior to re-enabling the work holder; and means to cut off the completed article.

8. In a machine of the class described, the combination with a frame; and a drive shaft mounted therein; of a rotatable work-holding mechanism adapted to grip the stock to be operated upon, and turn it on its axis; means to release the grip of the work-holder on the stock, advance the stock and reestablish the gripping action of the work holder on the stock; a tool holder having a tool to operate on the stock; a stop and rest member shiftable into and out of line with the path of the stock and toward and from the stock in line therewith; and means to cut off the completed article.

9. In a machine of the class described; the combination with a frame; and a drive shaft mounted therein; of a rotatable work-holding mechanism adapted to grip the stock to be operated upon, and turn it on its axis; means to release the grip of the work-holder on the stock, advance the stock and re-establish the gripping action of the work holder on the stock; a tool holder having a tool to operate on the stock; means to arrest the stock on its advance, and to restore the work to proper position relatively to the tool prior to re-enabling the work-holder; and adjustment to position the stock-arresting and restoring means laterally relatively to the work; and means to sever the completed article from the stock.

10. In a machine of the class described; the combination with a frame; and a drive shaft mounted therein; of a rotatable work-holding mechanism adapted to grip the stock to be operated upon, and turn it on its axis, means to release the grip of the work-holder on the stock, advance the stock and re-establish the gripping action of the work-holder on the stock; a tool holder having a tool to operate on the stock; means to arrest the stock on its advance, and to restore the work to proper position relatively to the tool prior to re-enabling the work-holder; an adjustment to vary the timing of the stock-arresting and restoring means relatively to the stock; and means to sever the completed article.

11. In a machine of the class described; the combination with a frame; and a drive shaft mounted therein; of a rotatable work-holding mechanism adapted to grip the stock to be operated upon, and turn it on its axis; means to release the grip of the work-holder on the stock, advance the stock and re-establish the gripping action of the work holder on the stock; a tool holder having a tool to operate on the stock; an arm adapted for reciprocatory movement; a holder carried by the arm; an arbor mounted in the holder; a stock-arresting and restoring means removably mounted in the arbor; a cam to reciprocate the arm to withdraw the stock-arresting and restoring means from the stock, and to return the stock-arresting and restoring means to cause it to restore the stock to proper position relatively to the tool; and means to sever the finished article from the stock.

12. In a machine of the class described; the combination with a frame; and a drive shaft mounted therein; of a rotatable work-holding mechanism adapted to grip the stock to be operated upon, and turn it on its axis; means to release the grip of the work-holder on the stock, advance the stock and re-establish the gripping action of the work-holder on the stock; a tool holder having a tool to operate on the stock; means to arrest the stock on its advance, and to restore the work to proper position relatively to the tool prior to re-enabling the work-holder; means to sever the completed article from the stock; and adjusting mechanism as to the time of severance and the extent of travel of the severing means.

In testimony whereof I affix my signature.

HOWARD B. SCOTT.